US010845325B2

(12) United States Patent
Maboudian et al.

(10) Patent No.: US 10,845,325 B2
(45) Date of Patent: Nov. 24, 2020

(54) IN-SITU LOCALIZED GROWTH OF POROUS METAL OXIDE FILMS ON MICROHEATER PLATFORM FOR LOW TEMPERATURE GAS DETECTION (71) Applicant: THE REGENTS OF THE UNIVERSITY OF CALIFORNIA, Oakland, CA (US)

(72) Inventors: Roya Maboudian, Orinda, CA (US); Hu Long, Albany, CA (US); Anna Harley-Trochimczyk, Berkeley, CA (US); William Mickelson, Albany, CA (US); Carlo Carraro, Orinda, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 223 days.

(21) Appl. No.: 16/045,300

(22) Filed: Jul. 25, 2018

(65) Prior Publication Data
US 2019/0041352 A1 Feb. 7, 2019

Related U.S. Application Data
(63) Continuation of application No. PCT/US2017/015626, filed on Jan. 30, 2017.
(Continued)

(51) Int. Cl.
G01N 27/407 (2006.01)
G01N 27/12 (2006.01)
G01N 27/406 (2006.01)

(52) U.S. Cl.
CPC ....... *G01N 27/4075* (2013.01); *G01N 27/127* (2013.01); *G01N 27/4067* (2013.01); *G01N 27/4074* (2013.01)

(58) Field of Classification Search
CPC .... G01N 27/12; G01N 27/125; G01N 27/127; G01N 27/4067; G01N 27/407; G01N 27/4071; G01N 27/4074; G01N 27/4075
(Continued)

(56) References Cited

U.S. PATENT DOCUMENTS
2003/0159928 A1  8/2003  Kojima
2012/0138459 A1  6/2012  Chen
(Continued)

FOREIGN PATENT DOCUMENTS
KR   1020150070681      *  6/2015  ............ G01N 27/26
KR   1020150070681 A       6/2015

OTHER PUBLICATIONS

Korean Intellectual Property Office (KIPO), international search report and written opinion dated May 12, 2017, related PCT international application No. PCT/US2017/015626, pp. 1-16, claims searched, pp. 17-20.
(Continued)

*Primary Examiner* — Benjamin R Schmitt
(74) *Attorney, Agent, or Firm* — O'Banion & Ritchey LLP; John P. O'Banion (57) ABSTRACT A solid-state, low power microheater sensor platform that is configurable with selected metal oxide films for particular gas sensing applications is described. The sensor platform is configured by selecting a chemiresistive or catalytic material that is suitable for detecting a desired gas and then forming a porous nanostructured film on the designated surfaces of the microheater platform. Also described are methods for creating a highly porous, nanostructured metal oxide film in a controlled location from a liquid precursor using a localized heat source. By fast annealing deposited liquid precur-
(Continued)

sors with the microheater, a highly porous, nanocrystalline metal oxide film can be generated in-situ and locally on the sensor platform.

17 Claims, 6 Drawing Sheets

Related U.S. Application Data (60) Provisional application No. 62/289,217, filed on Jan. 30, 2016.

(58) Field of Classification Search
USPC .............................................. 73/31.05, 31.06
See application file for complete search history.

(56) References Cited

U.S. PATENT DOCUMENTS

2014/0318960 A1   10/2014   Huang
2015/0377823 A1   12/2015   Akasaka

OTHER PUBLICATIONS

Harley-Trochimczyk, Anna et al., "Catalytic hydrogen sensing using microheated platinum nanoparticle-loaded graphene aerogel", Sensors and Actuators B 206 (2015) 399-406, published online Oct. 2, 2014.

* cited by examiner

IN-SITU LOCALIZED GROWTH OF POROUS METAL OXIDE FILMS ON MICROHEATER PLATFORM FOR LOW TEMPERATURE GAS DETECTION

CROSS-REFERENCE TO RELATED APPLICATIONS

This application is a 35 U.S.C. § 111(a) continuation of PCT international application number PCT/US2017/015626 filed on Jan. 30, 2017, incorporated herein by reference in its entirety, which claims priority to, and the benefit of, U.S. provisional patent application Ser. No. 62/289,217 filed on Jan. 30, 2016, incorporated herein by reference in its entirety. Priority is claimed to each of the foregoing applications.

The above-referenced PCT international application was published as PCT International Publication No. WO 2017/132667 on Aug. 3, 2017, which publication is incorporated herein by reference in its entirety.

STATEMENT REGARDING FEDERALLY SPONSORED RESEARCH OR DEVELOPMENT

This invention was made with government support under 1444950 awarded by the National Science Foundation and under DE-AC02-05CH11231 awarded by the US Department of Energy. The Government has certain rights in the invention.

INCORPORATION-BY-REFERENCE OF COMPUTER PROGRAM APPENDIX

Not Applicable

BACKGROUND

1. Technical Field

The technology of this disclosure pertains generally to devices and methods for gas sensing, and more particularly to a low power, solid state oxide based gas sensor on a microheater platform apparatus and methods for forming metal oxide sensor material on the microheater surface in situ.

2. Background Discussion

Solid-state chemical sensors have received considerable attention in recent years as monitors for environmental pollution and air quality. The accurate detection of toxic and flammable gases is critical to public health and the environment, and to the safe operation of many industrial processes.

Nanostructured metal oxides have generated interest for sensing applications due to their high surface area, low thermal mass, and superior sensitivities. Metal oxide gas sensors are based on the surface reactions between the target gas species and the sensing metal oxide film. As a result of the surface reactions, gas molecules interact with the film surface and then the measurable resistivity of the metal oxide layer changes. However, the integration of nanomaterials into sensors in a stable and reproducible way so that these electrical properties can be used has proven to be difficult.

Semiconducting metal oxide sensors are also promising solid-state chemical sensors due, in part, to the large variety of metal oxides available and their low cost in mass production. However, in order to obtain appropriate sensitivity levels, the metal oxides need to be heated to high temperatures (~300° C. to 500° C.), resulting in high power consumption (typically several hundred mW) and thus prohibiting their implementation as long-term, battery-powered gas monitors.

Power consumption can be decreased by reducing the sensor size and/or the operation sensing temperature. Metal oxide gas sensor miniaturization can be accomplished through the use of microfabrication methods to create a microheater platform. Microheaters allow high sensing temperatures to be reached with low input power through the use of a small heater element thermally isolated from the substrate. However, the shrunken device footprint means a loss of area for the sensing material, which negatively impacts sensitivity and the lifetime of the heating element.

Nanostructured metal oxides have been shown to have better gas sensing performance than the corresponding bulk material. Nanostructured materials with high surface-to-volume ratios can improve the sensitivity through an increase in surface area per device footprint as well as a greater number of grain contacts in the conductive path, which amplify the signal during gas exposure.

However, the integration of networks of nanowires or nanoparticles onto a microfabricated platform is difficult to control. Nanomaterial aggregation during film formation and sensor operation leads to a loss of active surface area and slows the diffusion of the target gas to the active sites. Formation of nanostructured films through the use of sacrificial templates such as polystyrene spheres, carbon nanotubes or anodized aluminum oxides adds to the complexity and cost.

Vacuum deposition techniques such as sputtering or evaporation require masking to control the deposition location and produce low surface area films that do not offer substantial sensing performance improvement. Sacrificial templating steps have been suggested to introduce higher surface area during deposition, including the use of polystyrene spheres, carbon nanotubes, and anodized aluminum oxide, but the manufacturing complexity and cost are not suitable for high volume production. An alternative deposition method consists of first synthesizing nanomaterials followed by suspension in solution for printing or dropcasting, which has issues with reproducibility due to the tendency of nanomaterials to aggregate and settle out of suspension.

Accordingly, there remains a need for a simple, effective approach to the preparation of nanostructured metal oxide films for low power, miniaturized gas sensors with high sensitivity.

BRIEF SUMMARY

The present technology provides a solid-state, low power microheater sensor platform that is configurable with selected metal oxide films for particular gas sensing applications. The sensor platform is configured by selecting a chemiresistive or catalytic material that is suitable for detecting a desired gas and then forming a porous nanostructured film on the designated surfaces of the microheater platform.

A method is provided for creating a highly porous, nanostructured metal oxide film in a controlled location from a liquid precursor using a localized heat source. By fast annealing deposited liquid precursors with the microheater, a highly porous, nanocrystalline metal oxide film can be generated in situ and locally on the sensor platform. With only minimal processing, a configured, high performance, miniaturized gas sensor is produced and ready for use.

With this method, the use of a liquid precursor solution eliminates the problems associated with conventional processing steps, i.e. the need to separately synthesize nanomaterials and to suspend them into a stable ink for deposition. The localized heat source acts to both evaporate the solvent and to thermally decompose the precursor into a highly porous film of nanocrystalline metal oxide, as well as to define the location of the formed film.

A carbon monoxide sensor using an in situ synthesized porous tin oxide ($SnO_2$) sensing film was made as a demonstration of the methods. Taking advantage of the fast thermal response of the microheater platform, a liquid precursor of metal oxide was drop-casted onto the microheater and rapidly sintered to form a porous film of $SnO_2$ nanoparticles, which gives high surface area and allows for fast gas diffusion to all active sites. The exceptional gas sensing performance of the nanostructured $SnO_2$ film was demonstrated by the fast, highly sensitive response to carbon monoxide at low operating temperatures. The sensor exhibited a low detection limit and fast response and recovery time at low operating temperatures. This facile fabrication method is very flexible and has great potential for large-scale gas sensor fabrications.

According to one aspect of the technology, methods of fabrication of high performance, miniaturized gas sensors are provided through on-chip generation of highly porous and nanostructured metal oxide films.

Another aspect of the technology is to provide a configurable gas sensor with selectable nanostructured metal oxide films on a low power microheater sensor platform.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, embodiments of systems and methods for biosignal processing are generally shown. Several embodiments of the technology are described generally in FIG. 1 through FIG. 6B to illustrate the devices and methods for in-situ growth of porous metal oxide thin films on a microheater platform for low temperature gas detections. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
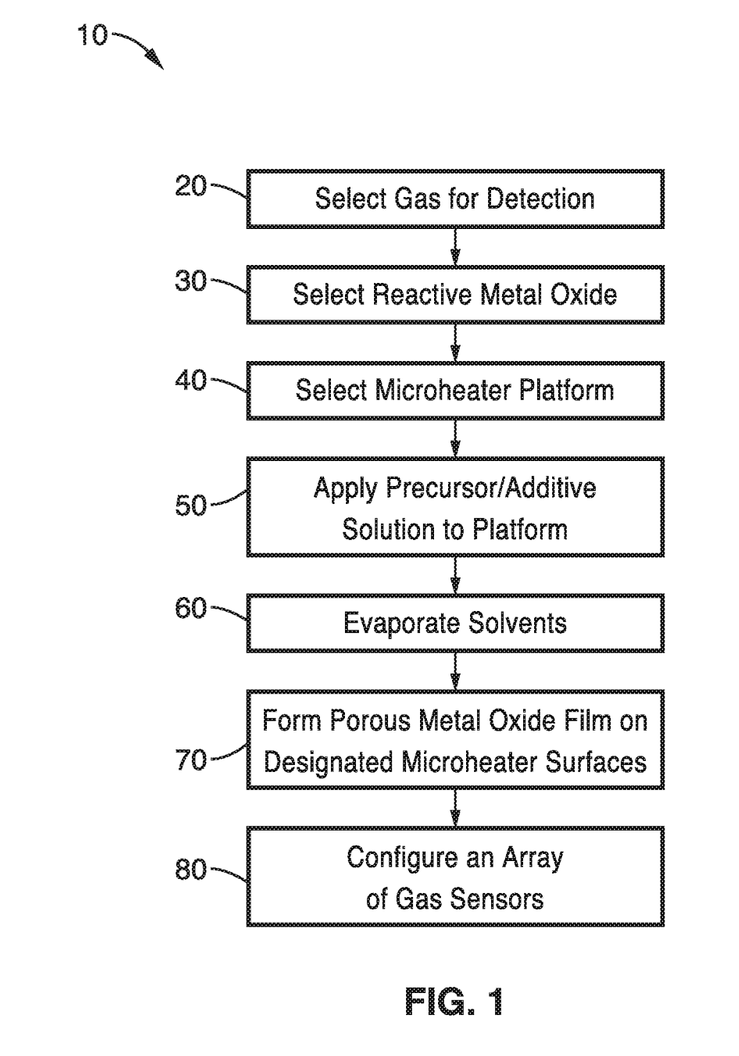
FIG. 1 is a functional flow diagram of the methods for producing porous metal oxide films in situ on a low power microheater according to one embodiment of the technology.

Turning now to FIG. 1, a flow diagram of one embodiment of a method 10 for on-chip generation of highly porous and nanostructured metal oxide films for miniaturized gas sensor applications. The methods allow for custom configurations of sensor chips as well as the formation of systems with arrays of customized sensor chips.

Fabrication of the configurable solid state sensor begins with the selection of the specific gas or gases for detection at block 20 of FIG. 1. This selection will guide the selection of metal oxide at block 30 because the sensor detects reactions or interactions between the metal oxide and the target gas. A wide variety of gases, vapors or smoke can be detected with metal oxides or metal oxides with additives. For example, materials selected at block 20 may include gases such as CO, $CO_2$, NO, $NO_2$, $SO_2$, $H_2S$, $CH_3OH$, $C_2H_5OH$, $NH_3$ as well as Butylamines, Propanol, Acetone, Methane, Propane, Benzene, Toluene and many others.

Metal oxides that are selected at block 30 of FIG. 1 can also be optimized for reactivity, sensitivity, temperature requirements or ease of crystalline film formation. There are many metal oxides that may be suitable for detecting oxidizing, combustible or reducing gases by conductive measurements. The following oxides have shown a response to gases in their conductivity: ZnO, $SnO_2$, $Cr_2O_3$, $Mn_2O_3$, $Co_3O_4$, NiO, CuO, SrO, $In_2O_3$, $WO_3$, $TiO_2$, $V_2O_3$, $Fe_2O_3$, $GeO_2$, $Nb_2O_5$, $MoO_3$, $Ta_2O_5$, $La_2O_3$, $CeO_2$, $Nd_2O_3$, and $Al_2O_3$. Metal oxides that are selected for gas sensors at block 30 can often be determined from their electronic structure or by trial and error.

The metal oxide that is selected can also include dopants or additives. In one embodiment the metal oxides can have metal additives such as Au, Al, Ag, Cu, Fe, In, Li, Ru, Ti, Mo, Mg, Pt, Pd and Zn. In another embodiment, the selected metal oxide can have an oxide additive such as CuO, $TiO_2$, $SnO_2$, $WO_3$, NiO, $Fe_2O_3$ and $Bi_2O_3$. For example, the selected metal oxide can be a binary oxide such as $SnO_2$—ZnO, $Fe_2O_3$—ZnO and ZnO—CuO configured for NOx detection. In another example, $WO_3$—Ti, $WO_3$—$In_2O_3$, $WO_3$—$Bi_2O_3$, and $WO_3$—Pd, Pt, or Au, have been used to fabricate selective and sensitive NOx gas sensors.

The nature of the selected gas for detection at block 20 and the metal oxide that is selected at block 30 may also influence the determination of the microheater platform that is selected in the step at block 40 of FIG. 1. There are two types of microheater platforms that are preferred depending on the heating requirements of the detection. The first type is a polysilicon microheater for applications that have comparatively lower temperature and lower power requirements. The second type of microheater platform is a silicon carbide platform for comparatively higher temperature and power applications. These microheaters have essentially similar structures within the chip design.

The microheater platform that is selected preferably has low power consumption, fast thermal response times, uniform temperature distribution, a long service life and mechanical stablity. Poly-silicon based microheaters are generally fabricated by depositing a low stress silicon nitride (LSN) film on a silicon wafer using low pressure chemical vapor deposition (LPCVD). Poly-Si heating elements are then applied to the nitride film. Electrodes are then deposited. A $SiO_2$ passivation layer is usually applied to prevent oxidation of the poly-si during heating. Finally, the back side of the Si wafer is then deep etched to expose the LSN membrane. The thin LSN membrane electrically isolates the microheating elements from the sensing layer and minimizes conductive heat loss to the silicon substrate. In one embodiment, the microsensor comprises a porous nanostructured $SnO_2$ layer contacted by platinum electrodes deposited on a polycrystalline silicon (polysilicon) microheater embedded in a thin low-stress silicon nitride (LSN) membrane as illustrated in the cross-sectional schematic in FIG. 2C.

Similarly, the silicon carbide based microheater is generally fabricated by depositing a low stress silicon nitride (LSN) film on a silicon wafer followed by a doped SiC layer by low pressure chemical vapor deposition. The SiC layer is patterned and etched to form the microheaters. A second LSN layer is then deposited to encapsulate the microheaters. A window is then etched in the top LSN layer. Metal contacts are created through photolithography, evaporation, and lift-off. A window is etched in the back-side of the wafer. The silicon substrate is etched with hot KOH to release the membrane. Sensing or catalytic materials are then deposited on the microheater for gas sensing.

Figure 2A:
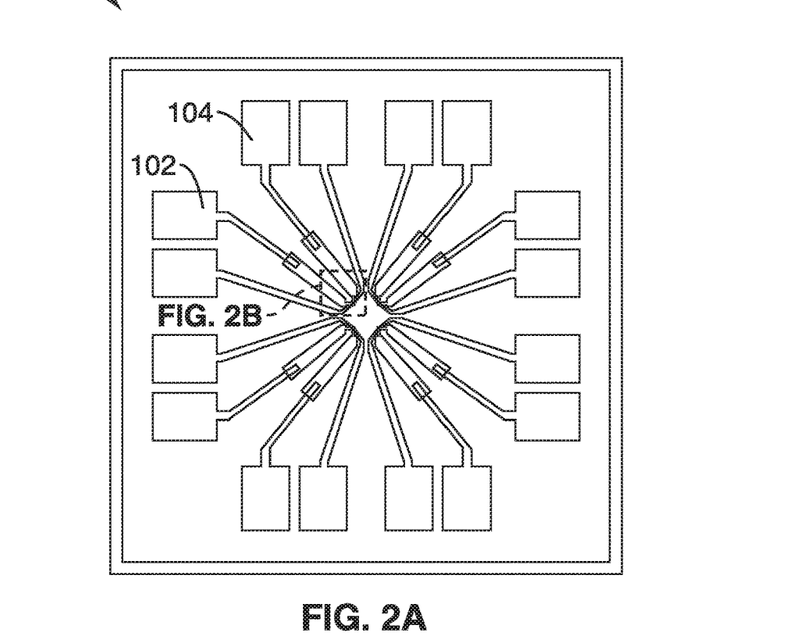
FIG. 2A is a schematic top plan view of a sensor chip with a four microheater platform according to one embodiment of the technology.
Figure 2B:
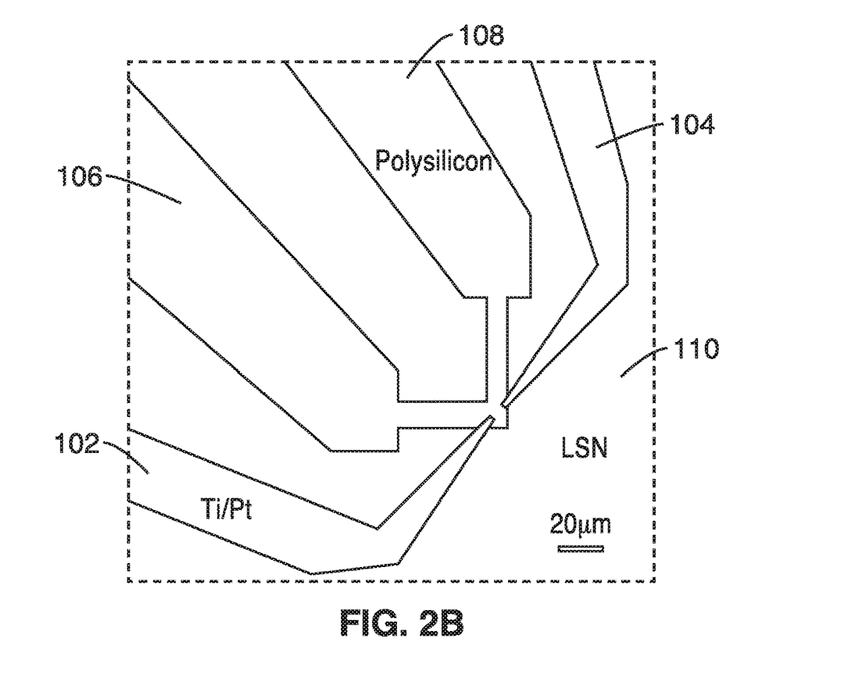
FIG. 2B is a detailed view of one microheater of the sensor chip of FIG. 2A.
Figure 2C:
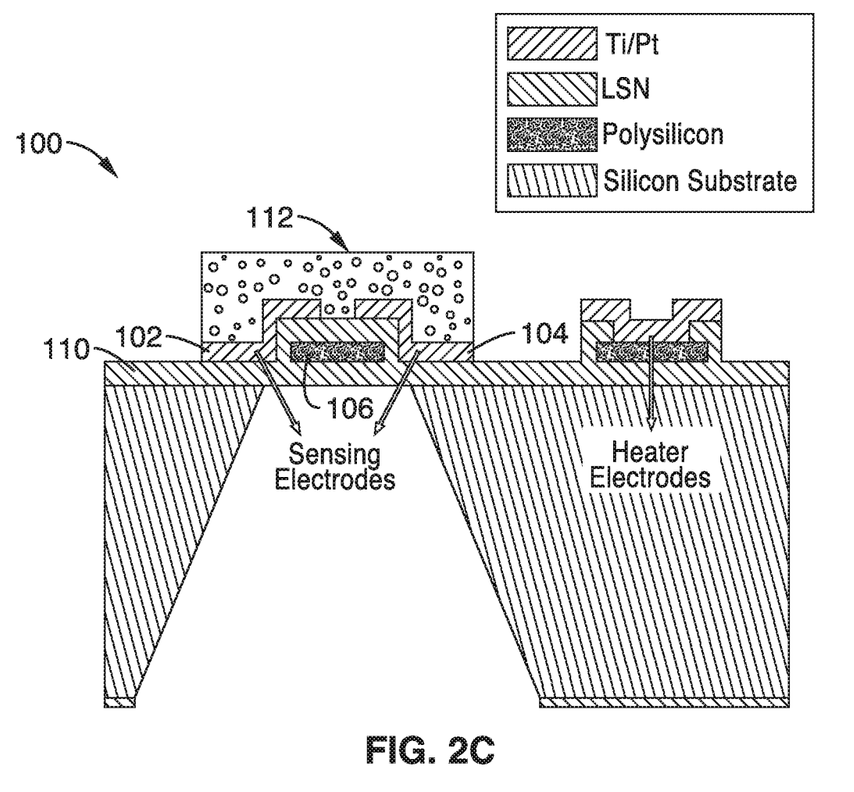
FIG. 2C is a schematic cross-sectional view of the sensor chip detail of FIG. 2B.

An example of a gas sensing chip platform 100 with four microheater elements is shown in FIG. 2A through FIG. 2C. A detailed view of one microheater element of the platform is shown in FIG. 2B. In this embodiment, the platform 100 has a heating element that is ringed with heating and sensing electrodes 102, 104. Although four heating elements are shown, it will be understood that the chip can be configured with any number of heating elements.

As shown in the detailed view of FIG. 2B, the electrodes 102, 104 and poly-Si or Si—C heating element arms 106, 108 are disposed on a low-stress silicon nitride membrane 110. The electrodes are electrically coupled to a power source and controller (not shown) that control the actuation of the heating elements of the chip 100.

Referring back to FIG. 1, the microheater platform selected at block 40 is functionalized with the formation of a porous metal oxide film on designated surfaces of the platform. This is accomplished with the application of a liquid oxide precursor solution to the microheater platform at block 50. The precursor solution that is used at block 50 is typically prepared by mixing one or more metal salts and solvents to form a solution that is deposited on the microheater section of the chip. Optionally, dopants or other additives can be included in the precursor solution that are included to improve the functionality of the final crystalline film.

Figure 3:
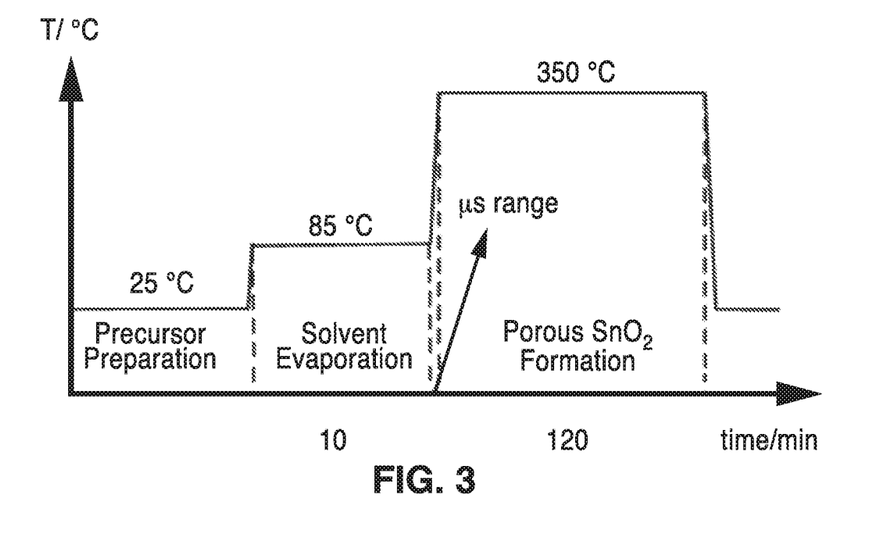
FIG. 3 is a temperature profile of the in situ synthesis of a porous metal oxide sensor.

As illustrated in the temperature profile of FIG. 3, the precursor solution is preferably prepared approximately room temperature (e.g. 25° C.) and deposited on the microheater platform that is at about the same temperature. Once applied to the microheater platform, the microheaters of the platform are actuated and brought to a temperature that will facilitate the evaporation of the solvent at block 60 of FIG. 1. In the illustration shown in FIG. 3, the microheater was brought to a temperature of 85° C. for a sufficient period of time to evaporate the solvents. Often, the precursor liquid preparation will form a gel phase at block 60.

After the solvents have volatized at block 60, the temperature of the microheater is significantly increased at block 70, preferably with a fast heating rate to form a porous metal oxide film as seen in the temperature profile of FIG. 3. The fast heating rate at block 70 causes the formation of mesopores or macropores in the structure of the final oxide film 112 as illustrated in FIG. 2C. By fast annealing deposited liquid precursors with the microheater, a highly porous, nanocrystalline metal oxide film can be generated in-situ and locally on the sensor platform. With only minimal processing, a customized, high performance, miniaturized gas sensor is ready for use.

Optionally, at block 80 of FIG. 1, an array of sensors with different metal oxide films can be constructed. Such an array can conduct simultaneous detections from a stream of feed gases. Individual sensor responses can also be compared in real time to confirm results or to identify false positives.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the operational principles of the apparatus and fabrication methods, a microheater platform was produced and a nanostructured metal oxide film of tin oxide ($SnO_2$) was formed on the platform using the processing steps shown generally in FIG. 1 and the morphology of the resulting film was evaluated.

Microheaters were fabricated using a 4-mask surface micromachining process to create a polysilicon microheater embedded in a thin silicon nitride membrane as illustrated in FIG. 2A to FIG. 2C.

First, a 100 nm thick film of low-stress silicon nitride (LSN) was deposited on a silicon wafer by low-pressure chemical vapor deposition (LPCVD). This was followed by the deposition of 150 nm of in situ n-doped polysilicon. The wafers were then heated to 1050° C. for film stress release. The microheater was then patterned into the polysilicon layer using photolithography and reactive ion etching. This was followed by another 100-nm-thick LSN layer deposition to encapsulate the polysilicon microheater. Contact to the microheaters was made by patterning and removing the upper LSN layer by reactive ion etching and subsequent deposition of 10 nm of titanium and 90 nm of platinum. Finally, the wafers were patterned and KOH etched from the backside to remove the silicon under the microheaters leaving only the thin silicon nitride membrane.

The wafer was then diced into 3.5 mm×3.5 mm chips, which typically contain four individual microheaters per chip. The microheaters were 10 µm wide, 100 nm long, and 100 nm thick. No particular surface treatment was done to the chip before the metal oxide coating, except a basic cleaning to remove the photoresist used to protect the wafer surface during dicing (rinsed with acetone, isopropyl alcohol (IPA), de-ionized water, and dried with nitrogen). Once individualized, the microheater chips were wire-bonded into a 14-pin cer-dip package for electrical characterization.

A liquid precursor (rather than a nanomaterial suspension) was drop-cast onto the microheater surface and rapidly sintered to form a porous film of $SnO_2$ nanoparticles thereon. The liquid $SnO_2$ precursor was prepared by mixing $SnCl_4$, $NH_4OH$, ethanol, and water under continuous stirring at room temperature. After stirring for 1 hour at room temperature (25° C.), a 1 μL drop was placed on the packaged microheater chip and the heater was powered to 85° C. for 10 min to evaporate the solvent. The addition of $NH_4OH$ to the mixture helped to form a gel-like phase that produced a relatively smooth, uniform precursor film upon deposition and solvent evaporation, as observed in the scanning electron microscopy (SEM) images that were obtained.

After the 10 minute heating at 85° C., the microheater temperature was ramped to 350° C. (12.5 mW) and held there for 2 hours to form the final porous $SnO_2$ film. Because of the fast thermal response time of the microheater, the temperature reaches 350° C. in less than 1 ms, which leads to the quick removal of water from the gel-like precursor film to form a highly porous $SnO_2$ film. A fast heating rate leads to the formation of mesopores or macropores in the structure because of the rapid release of gaseous products. Due to the localized heat source, the film is only formed on the heated area, eliminating the need for masking or lithography to control the deposition location. After the two hour anneal, the film is ready for sensing with no further processing steps.

The final fabricated microsensor comprised a porous nanostructured $SnO_2$ layer contacted by platinum electrodes deposited on a polycrystalline silicon (polysilicon) microheater embedded in a thin low-stress silicon nitride (LSN) membrane as illustrated in the cross-sectional schematic in FIG. 2C.

The single microheater device had a heated area of only 50 μm×50 μm, which resulted in low power consumption (~18 mW to reach 500° C.). The sensing electrodes had a gap of only a few μm over the hottest region of the microheater, such that the sensor resistance was dominated by the metal oxide at that precise spot.

Besides the low power consumption, other benefits of the microheater platform included a fast thermal response time (<100 μs), and excellent stability in the temperature range of interest (200° C. to 450° C.). Additionally, the closed membrane configuration makes deposition of sensing material from a liquid precursor much easier compared to bridge microheater structures, where the liquid can wick off down to the cavity below. Before forming the film, the microheater was wire bonded into a conventional 14-pin ceramic dip package. This allowed for easy actuation of the heaters and sensing functions by a controller.

To understand the effect of heating rate, samples were prepared on silicon chips using an external hotplate. In the fast ramping case, the hotplate was preheated to 350° C. and the sample is placed on it after the 85° C. treatment. In the slow ramping case, the sample remains on the 85° C. hotplate and the temperature is changed to 350° C., which is reached after several minutes. It was observed that the slow heating rate film was very smooth, comparable to the precursor film. On the other hand, SEM images of the $SnO_2$ film synthesized with the fast heating rate show more cracks and higher surface roughness than the precursor film and the slow heating rate film, confirming that the fast heating rate is the key to the porosity of the film. Increased film porosity in the sintered $SnO_2$ film is seen at several length scales from micron-sized cracks to nanometer-sized pores. The composition and phase purity of the sintered film were also examined by X-ray diffraction, which confirmed the conversion of the precursor to polycrystalline $SnO_2$.

The nanoscale features of the porous $SnO_2$ film were visible using transmission electron microscopy (TEM). Interconnected nanoparticles with an average size of 4 nm were observed. Smaller particles have higher surface to volume ratios, which are favorable for gas sensing applications due to both the increased number of active sites per device footprint as well as the increased number of grain contacts in the conductive sensing path. Numerous interparticle pores with diameters of 1-4 were uniformly distributed throughout the whole film. The lattice spacing was 0.336 nm, which can be readily indexed to the (110) crystal plane of the $SnO_2$, further confirming the formation of crystalline $SnO_2$. The corresponding selected area electron diffraction (SAED) pattern also indicated the polycrystalline nature of the $SnO_2$. The SAED diffraction rings, plus the high background and broad peaks of the XRD confirmed the TEM observation of nanosized $SnO_2$ particles. The porosity of the $SnO_2$ film on multiple length scales was expected to enhance gas sensing performance because it offers channels for gas diffusion to a large number of active sites.

The porous features of the film were defined through the fast heating rate supplied by the microheater, making this a simple method to integrate a porous nanostructured sensing film onto a microheater-based sensor. Because the precursor solution is liquid, it is possible to manufacture these sensors with materials printing methods without concerns about stable suspensions of nanomaterials or clogged printer heads. Additionally, there was no concern about obtaining a connected network of nanomaterials between the sensing electrodes, as the liquid precursor is converted to the nanostructured metal oxide film precisely where it was required, as dictated by the microheater temperature profile in FIG. 3.

Example 2

The capabilities of the fabricated sensor with the porous $SnO_2$ film as a gas sensor for detection of carbon monoxide were evaluated. The microheater cer-dip package was placed within a gas flow chamber with a volume of 1 $cm^3$. The sensor was exposed to CO using a computer-controlled gas delivery system. A cylinder of 5000 ppm CO gas balanced in nitrogen was used (Praxair). Sensor testing was performed at a constant flow rate of 300 sccm. Mass flow controllers (Bronkhorst) controlled by LabView were used to dilute the gas mixture cylinder with clean air and deliver these gases to the sensor chamber. Flow stream temperatures were recorded and were within a few degrees of room temperature.

Figure 5:
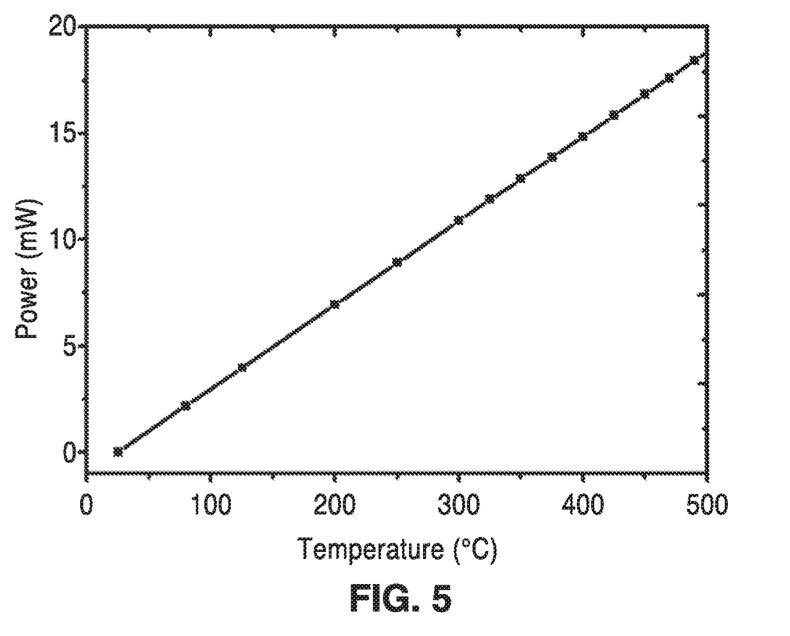
FIG. 5 is a plot of the power consumption of the microheater at different operating temperatures.

The measurement of the microheater sensor was performed using a Keithley 2602 dual-channel source-meter. The source-meter was controlled using Zephyr, an open-source Java-based instrument and control and measurement software suite. A bias voltage of 0.5 V is applied to the sensor channel to measure the resistance of sensor channel. A variable power (controlled by voltage) is applied to the microheater to control the operation temperature. FIG. 5 shows the relationship between the microheater power and operation temperature.

All of the information from the source-meter, the gas delivery system, such as flow rates and concentrations, and any reference sensors, such as temperature sensors was also recorded by Zephyr. The current through the sensor channel was also recorded and its resistance, R, was calculated. The sensor response was determined by the relative change in resistance, which is defined as $R_{air}/R_{gas}$, where $R_{air}$ is the average sensor resistance in clean air and $R_{gas}$ is the average sensor resistance during CO exposure once the response has stabilized.

Figure 6A:
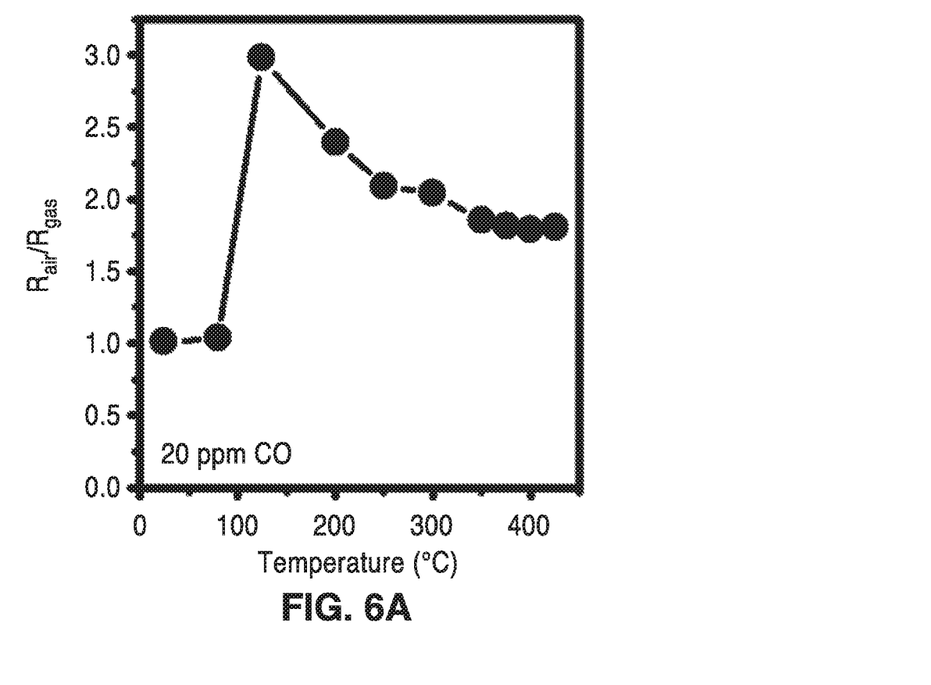
FIG. 6A is a plot of the sensitivity of the sensor for 20 ppm CO at various operating temperatures.
Figure 6B:
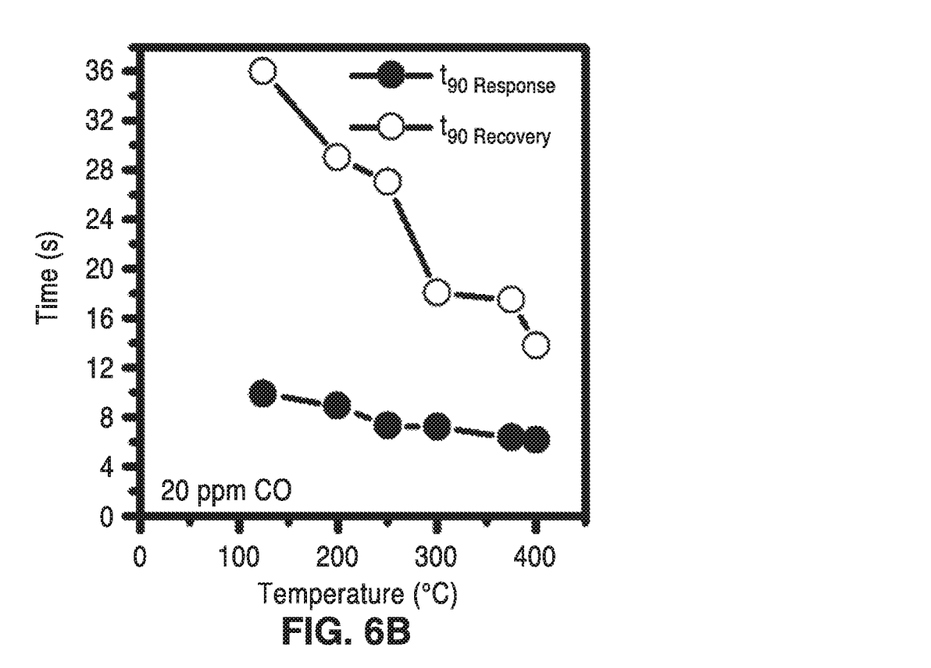
FIG. 6B is a plot of response and recovery times of the sensor at various operating temperatures.

The operating temperature of 200° C. is an optimum value when considering the sensitivity, the response and recovery time, and the power consumption. As seen in FIG. 6A and FIG. 6B, the response to 20 ppm CO is the highest at 125° C., and decreases with higher temperature to eventually plateau at 1.8 and the response and recovery time continuously decrease with increasing temperature. Operation at 200° C. gives a recovery time of <30 s, sensitivity above 2 for 20 ppm, and a power consumption of ~7 mW.

Figure 4A:
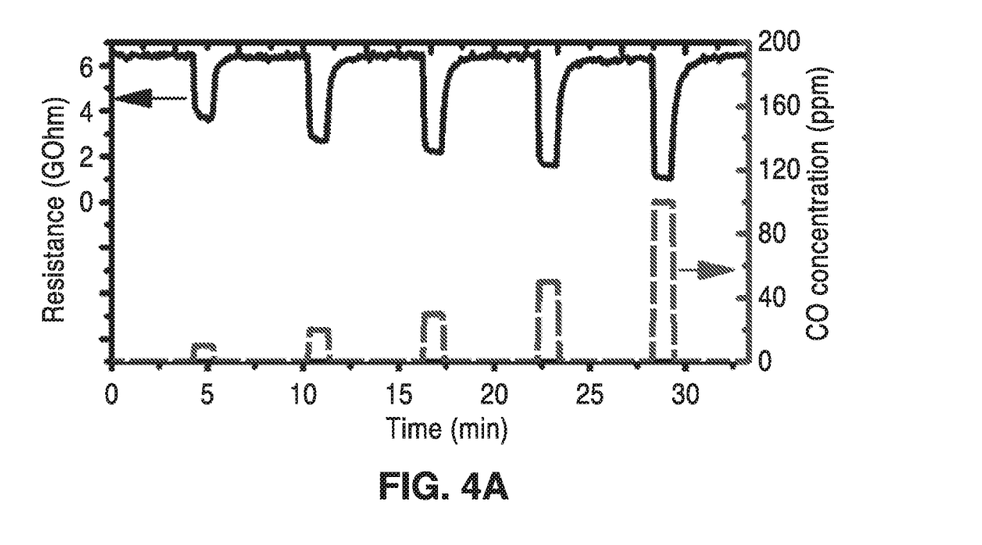
FIG. 4A is a plot showing real time resistance change of the sensor for varying CO concentration versus time at 200° C. (7 mW).

FIG. 4A shows real time resistance change of the $SnO_2$ sensor to various CO concentrations with a microheater operating temperature of 200° C., which required only a 7 mW power consumption for continuous measurements. Operating the sensor at 200° C. represents at optimum for the sensitivity, response and recovery time, and power consumption (See FIG. 5 and FIG. 6A and FIG. 6B). As seen in FIG. 4A, the sensor resistance showed a rapid response during exposure to varied CO concentrations and a full baseline recovery. Tin oxide is an n-type semiconductor and its resistance is determined by surface states, which are affected by the adsorption of oxygen species. In ambient air, chemisorbed oxygen species on the $SnO_2$ surface trap electrons, creating an electron-depleted region, which leads to a barrier at the interface between contacting nanoparticles. The introduction of CO onto the surface at elevated temperature leads to reaction of CO with the surface oxygen species to form $CO_2$. The removal of the oxygen releases the trapped electrons and lowers the barrier between contacting nanoparticles, which leads to a measurable decrease in resistance.

Figure 4B:
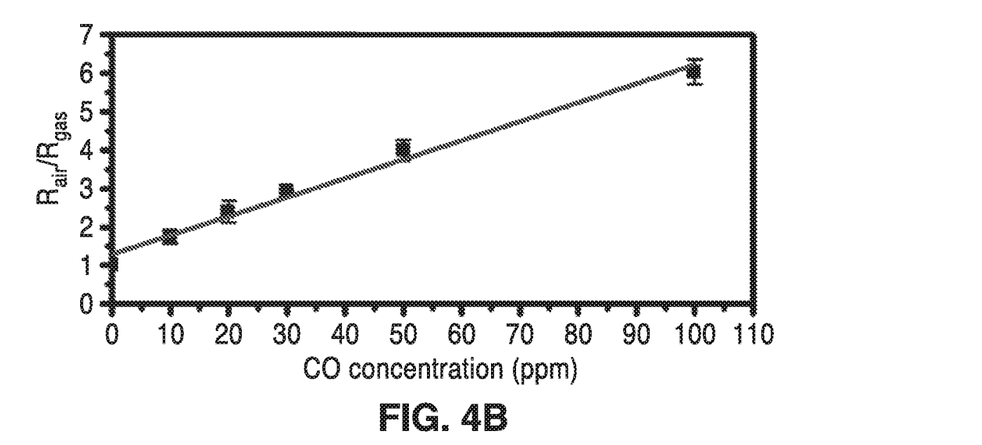
FIG. 4B is a plot of the sensor response ($S=R_{air}/R_{gas}$) for different CO concentrations at 200° C., where $R_{air}$ is the average sensor resistance in clean air and $R_{gas}$ is the average sensor resistance during CO exposure once the response has stabilized.

FIG. 4B is a plot of the sensor response ($R_{air}/R_{gas}$) versus CO concentration, exhibiting a linear relationship, where $R_{air}$ is the average sensor resistance in clean air and $R_{gas}$ is the average sensor resistance during CO exposure once the response has stabilized. The sensitivity is comparable to other known sensors, but with a lower operating temperature (200° C. vs. 300-500° C.), which allows for lower power consumption. The responses of three devices were within 20% of one another on average, demonstrating the uniformity of this process. Due to the accuracy of the mass flow controllers in the gas delivery system, the lowest concentration of CO that can be reliably delivered is 10 ppm (corresponding to signal-to-noise threshold of 17.4), but using a typical signal-to-noise threshold of 3, the detection limit of the sensor is 1.75 ppm.

The enhancement in gas-sensing properties of the porous $SnO_2$ sensor may be ascribed to the small crystalline size of the interconnected nanoparticles, which gives a high surface to volume ratio and generates more active sites per device footprint. Additionally, the small crystal size increases the number of grain contacts in the conductive path between sensing electrodes, increasing the number of energy barriers that are the main source of sensitivity. The average time to reach 90% of the stable sensor signal ($t_{90}$) is 9 seconds and the $t_{90}$ for recovery is 29 seconds. Other reported $SnO_2$-based sensors respond in several tens of seconds and take several minutes for recovery. The improved response may be attributed to the multi-scale porosity, which allows for fast diffusion to all active sites. The nanostructured $SnO_2$ film shows excellent sensing performance, even with low operating temperature on a miniaturized microheater platform.

In summary a flexible and facile route process is presented for the localized growth of porous metal oxide films on a microheater platform to obtain high performance gas sensors. By sintering the suitable liquid-phase metal oxide precursor with a fast heating rate, a nanostructured metal oxide film with multi-length scale porosity can be generated right on the fabricated microheater platform. The demonstrated $SnO_2$-based CO sensor has low power consumption (~7 mW for 200° C.), low operating temperature (200° C.), low detection limit (~2 ppm CO), fast response time (<10 s) and recovery time (<30 s), and high sensitivity. More importantly, this facile fabrication strategy provides a way to manufacture high performance sensors with other types of metal oxides, and has the potential for low cost mass production.

From the description herein, it will be appreciated that that the present disclosure encompasses multiple embodiments which include, but are not limited to, the following:

1. A solid state gas sensing apparatus, comprising: (a) a microheater with heating and sensing electrodes and a top heating surface; and (b) a porous, nanocrystalline film of a metal oxide on the top heating surface and electrodes of the microheater; (c) wherein the metal oxide film is formed in situ by activation of the microheater.

2. The apparatus of any preceding embodiment, wherein the microheater comprises: (a) a silicon substrate; (b) a back-etched low-stress silicon nitride (LSN) membrane mounted on a top surface of the silicon substrate; (c) one or more heating elements encapsulated within the low-stress silicon nitride (LSN) membrane; and (d) electrodes operably coupled to each of the heating elements.

3. The apparatus of any preceding embodiment, wherein the heating element is a silicon carbide (SiC) or a polysilicon (poly-Si) heating element.

4. The apparatus of any preceding embodiment, wherein the porous metal oxide is an oxide selected from the group of oxides consisting of $ZnO$, $SnO_2$, $Cr_2O_3$, $Mn_2O_3$, $Co_3O_4$, $NiO$, $CuO$, $SrO$, $In_2O_3$, $WO_3$, $TiO_2$, $V_2O_3$, $Fe_2O_3$, $GeO_2$, $Nb_2O_5$, $MoO_3$, $Ta_2O_5$, $La_2O_3$, $CeO_2$, $Nd_2O_3$, and $Al_2O_3$.

5. The apparatus of any preceding embodiment, wherein the metal oxide film further comprises a dopant.

6. The apparatus of any preceding embodiment, wherein the metal oxide film further comprises an additive selected from the group of additives consisting of Au, Al, Ag, Cu, Fe, In, Li, Ru, Ti, Mo, Mg, Pt, Pd and Zn.

7. The apparatus of any preceding embodiment, wherein the metal oxide film further comprises an oxide additive selected from the group of additives consisting of $CuO$, $TiO_2$, $SnO_2$, $WO_3$, $NiO$, $Fe_2O_3$ and $Bi_2O_3$.

8. A method for fabricating a solid state gas sensor, the method comprising: (a) selecting a target material to be sensed by a sensor; (b) determining at least one metal oxide that will interact with the selected target material; (c) providing a microheater platform with heating and sensing electrodes and a top heating surface; (d) applying a prepared solution of at least one solvent and metal oxide precursor to the top heating surface of the microheater; (e) actuating the top heating surface of the microheater to a first temperature to evaporate the solvent from the metal oxide precursor solution; and (f) actuating the top heating surface of the microheater to a second temperature to form a porous metal oxide layer on the top heating surface of the microheater; (e) wherein the porous metal oxide layer is formed in situ without heating the entire microheater platform.

9. The method of any preceding embodiment, further comprising: configuring an array of sensors with microheater platforms with different metal oxide films.

10. The method of any preceding embodiment, further comprising: configuring an array of sensors with microheater platforms with the same metal oxide film; and comparing sensing results to confirm a gas detection.

11. The method of any preceding embodiment, wherein the microheater comprises: (a) a silicon substrate; (b) a back-etched low-stress silicon nitride (LSN) membrane mounted on a top surface of the silicon substrate; (c) one or more heating elements encapsulated within the low-stress silicon nitride (LSN) membrane; and (d) electrodes operably coupled to each of the heating elements.

12. The method of any preceding embodiment, wherein the heating element is a silicon carbide (SiC) or a polysilicon (poly-Si) heating element.

13. The method of any preceding embodiment, wherein the selected metal oxide is an oxide selected from the group of oxides consisting of ZnO, $SnO_2$, $Cr_2O_3$, $Mn_2O_3$, $Co_3O_4$, NiO, CuO, SrO, $In_2O_3$, $WO_3$, $TiO_2$, $V_2O_3$, $Fe_2O_3$, $GeO_2$, $Nb_2O_5$, $MoO_3$, $Ta_2O_5$, $La_2O_3$, $CeO_2$, $Nd_2O_3$, and $Al_2O_3$.

14. The method of any preceding embodiment, further comprising: adding at least one additive to the prepared metal oxide precursor solution.

15. The method of any preceding embodiment, wherein the additive is an additive selected from the group of additives consisting of Au, Al, Ag, Cu, Fe, In, Li, Ru, Ti, Mo, Mg, Pt, Pd and Zn.

16. The method of any preceding embodiment, wherein the additive is an additive selected from the group of additives consisting of CuO, $TiO_2$, $SnO_2$, $WO_3$, NiO, $Fe_2O_3$ and $Bi_2O_3$.

17. The method of any preceding embodiment, wherein the precursor solution comprises tin chloride, ammonium hydroxide, ethanol, and water.

18. A method for fabricating a nanostructured metal oxide film on a low power microheater sensor platform, the method comprising: (a) providing a lower power microheater sensor platform; (b) drop-casting a liquid metal oxide precursor onto the microheater sensor platform; and (c) rapidly sintering the liquid precursor to form a porous film of metal oxide nanoparticles.

19. The method of any preceding embodiment, wherein the porous film of metal oxide is an oxide selected from the group of oxides consisting of ZnO, $SnO_2$, $Cr_2O_3$, $Mn_2O_3$, $Co_3O_4$, NiO, CuO, SrO, $In_2O_3$, $WO_3$, $TiO_2$, $V_2O_3$, $Fe_2O_3$, $GeO_2$, $Nb_2O_5$, $MoO_3$, $Ta_2O_5$, $La_2O_3$, $CeO_2$, $Nd_2O_3$, and $Al_2O_3$ and an additive selected from the group of additives consisting of Au, Al, Ag, Cu, Fe, In, Li, Ru, Ti, Mo, Mg, Pt, Pd and Zn.

20. The method of any preceding embodiment, wherein the metal oxide is a binary oxide selected from the group $SnO_2$—ZnO, $Fe_2O_3$—ZnO and ZnO—CuO configured for NOx detection.

Embodiments of the present technology may be described herein with reference to flowchart illustrations of methods and systems according to embodiments of the technology, and/or procedures, algorithms, steps, operations, formulae, or other computational depictions, which may also be implemented as computer program products. It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A solid state gas sensing apparatus, comprising:
   (a) a microheater with heating and sensing electrodes and a top heating surface; and
   (b) a porous, nanocrystalline film of a metal oxide on the top heating surface and electrodes of the microheater;
   (c) wherein said metal oxide film is formed in situ by activation of the microheater.

2. The apparatus of claim 1, wherein said microheater comprises:
   (a) a silicon substrate;
   (b) a back-etched low-stress silicon nitride (LSN) membrane mounted on a top surface of the silicon substrate;
   (c) one or more heating elements encapsulated within the low-stress silicon nitride (LSN) membrane; and
   (d) electrodes operably coupled to each of the one or more heating elements.

3. The apparatus of claim 2, wherein said one or more heating element is a silicon carbide (SiC) or a polysilicon (poly-Si) heating element.

4. The apparatus of claim 1, wherein said metal oxide is an oxide selected from the group of oxides consisting of ZnO, $SnO_2$, $Cr_2O_3$, $Mn_2O_3$, $Co_3O_4$, NiO, CuO, SrO, $In_2O_3$, $WO_3$, $TiO_2$, $V_2O_3$, $Fe_2O_3$, $GeO_2$, $Nb_2O_5$, $MoO_3$, $Ta_2O_5$, $La_2O_3$, $CeO_2$, $Nd_2O_3$, and $Al_2O_3$.

5. The apparatus of claim 1, wherein said metal oxide film further comprises a dopant.

6. The apparatus of claim 1, wherein said metal oxide film further comprises an additive selected from the group of additives consisting of Au, Al, Ag, Cu, Fe, In, Li, Ru, Ti, Mo, Mg, Pt, Pd and Zn.

7. The apparatus of claim 1, wherein said metal oxide film further comprises an oxide additive selected from the group of additives consisting of CuO, $TiO_2$, $SnO_2$, $WO_3$, NiO, $Fe_2O_3$ and $Bi_2O_3$.

8. A method for fabricating a solid state gas sensor, the method comprising:
   (a) selecting a target material to be sensed by a sensor;
   (b) determining at least one metal oxide that will interact with the selected target material;
   (c) providing a microheater platform with heating and sensing electrodes and a top heating surface;
   (d) applying a prepared solution of at least one solvent and metal oxide precursor to the top heating surface of the microheater;

(e) actuating the top heating surface of the microheater to a first temperature to evaporate the solvent from the metal oxide precursor solution; and (f) actuating the top heating surface of the microheater to a second temperature to form a porous metal oxide layer on the top heating surface of the microheater;

(e) wherein said porous metal oxide layer is formed in situ without heating the entire microheater platform.

9. The method of claim 8, further comprising:
configuring an array of sensors with microheater platforms with different metal oxide films.

10. The method of claim 8, further comprising:
configuring an array of sensors with microheater platforms with the same metal oxide film; and
comparing sensing results to confirm a gas detection.

11. The method of claim 8, wherein said microheater comprises:
(a) a silicon substrate;
(b) a back-etched low-stress silicon nitride (LSN) membrane mounted on a top surface of the silicon substrate;
(c) one or more heating elements encapsulated within the low-stress silicon nitride (LSN) membrane; and
(d) electrodes operably coupled to each of said one or more heating elements.

12. The apparatus of claim 11, wherein said one or more heating element is a silicon carbide (SiC) or a polysilicon (poly-Si) heating element.

13. The apparatus of claim 1, wherein said metal oxide is an oxide selected from the group of oxides consisting of $ZnO$, $SnO_2$, $Cr_2O_3$, $Mn_2O_3$, $Co_3O_4$, $NiO$, $CuO$, $SrO$, $In_2O_3$, $WO_3$, $TiO_2$, $V_2O_3$, $Fe_2O_3$, $GeO_2$, $Nb_2O_5$, $MoO_3$, $Ta_2O_5$, $La_2O_3$, $CeO_2$, $Nd_2O_3$, and $Al_2O_3$.

14. The method of claim 8, further comprising:
adding at least one additive to the prepared metal oxide precursor solution.

15. The method of claim 14, wherein said additive is an additive selected from the group of additives consisting of Au, Al, Ag, Cu, Fe, In, Li, Ru, Ti, Mo, Mg, Pt, Pd and Zn.

16. The method of claim 14, wherein said additive is an additive selected from the group of additives consisting of $CuO$, $TiO_2$, $SnO_2$, $WO_3$, $NiO$, $Fe_2O_3$ and $Bi_2O_3$.

17. The method of claim 8, wherein said precursor solution comprises tin chloride, ammonium hydroxide, ethanol, and water.

* * * * *